United States Patent [19]

Henmi et al.

[11] 3,781,708
[45] Dec. 25, 1973

[54] D.C. DISCHARGE GAS LASER WITH NOVEL DISCHARGE TUBE

[76] Inventors: Noboru Henmi, 2-3, Midori-machi; Hiromi Kumagai, 3-4-6 Nishikubo, both of Musashino-shi, Tokyo, Japan

[22] Filed: Aug. 25, 1971

[21] Appl. No.: 174,604

[30] Foreign Application Priority Data
Sept. 5, 1970   Japan.............................. 45-78032

[52] U.S. Cl. ............................................ 331/94.5
[51] Int. Cl............................................... H01s 3/02
[58] Field of Search................................... 331/94.5

[56] References Cited
UNITED STATES PATENTS
3,614,654   10/1971   Gronros et al...................... 331/94.5
3,626,325   12/1971   Smith................................. 331/94.5
3,628,176   12/1971   Medicus............................. 331/94.5
3,466,567   9/1969    Neusel............................... 331/94.5

FOREIGN PATENTS OR APPLICATIONS
1,347,722   11/1963   France............................... 331/94.5

*Primary Examiner*—William L. Sikes
*Attorney*—John M. Webb

[57] ABSTRACT

A gas laser comprises a capillary tube and an external tube in which a gaseous lasing medium, such as carbon dioxide gas, is enclosed. Plasma for laser action is generated in the capillary tube by a D.C. discharge between an anode and a cathode. The length of the capillary tube and its relation to the electrodes is such that the plasma area is in said tube.

4 Claims, 3 Drawing Figures

D.C. DISCHARGE GAS LASER WITH NOVEL DISCHARGE TUBE

This invention relates to a gas laser, specifically a long life gas laser.

In a D.C. discharge gas laser, when a discharge is maintained in a discharge tube, the gaseous medium enclosed in said tube is ionized and the ionized gas particles are attracted to a cathode by electro-phoresis and absorbed. Consequently, the gas density in the discharge tube is not uniform throughout the full length of the tube with the result that the laser output decreases. Further, since the discharge tube is heated by the discharge, the gaseous medium in the tube passes through the wall of the tube causing a curtailment in the life of the D.C. discharge gas laser.

Briefly, according to this invention, a gas laser tube comprises a capillary tube and an external tube in which a gaseous medium, such as carbon dioxide gas, is enclosed. Both tubes are preferably coaxially arranged. At least a portion of the capillary tube is spaced about the lasing axis. Plasma for laser action is generated in the capillary tube by a D.C. discharge between two electrodes; i.e., an anode and a cathode. The length of the capillary tube is longer than the plasma area or the path of the D.C. discharge within the capillary tube.

The capillary tube has spaced openings, preferably near the cathode and anode. The ionized gas particles reaching the cathode are neutralized and then returned to the anode via the spaced openings and the external tube.

In this way, the local pressure of the tubes is kept constant and the life of the gas laser is not curtailed.

Therefore, it is an advantage of this invention to provide a long life gas laser. Another advantage of this invention is to provide a gas laser of high stability.

Various other objects and advantages of this invention will become readily apparent from the following description read with reference to the accompanying drawings in which.

Figure 1:
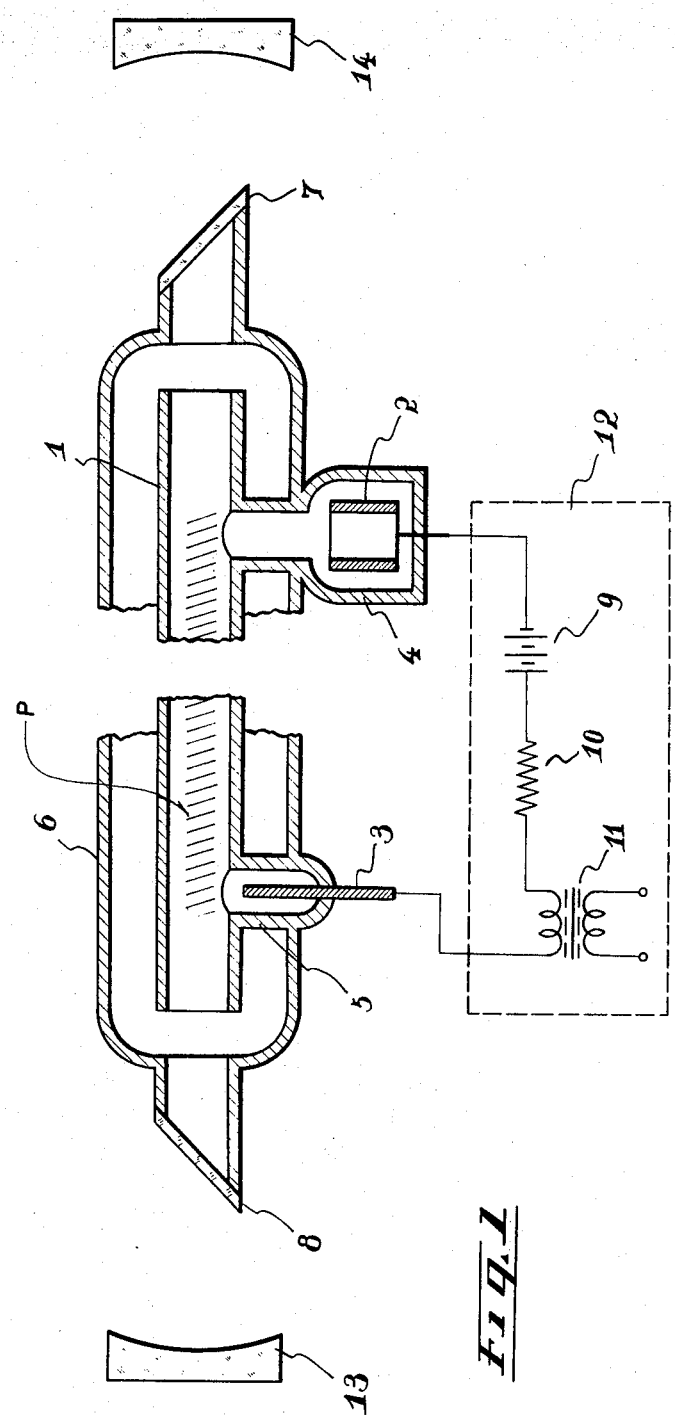
FIG. 1 is a cross-sectional view of a gas laser according to this invention.

Referring to FIG. 1, a capillary tube 1 is provided, for example, of quartz glass. A cathode 2 and an anode 3 are respectively arranged in branch tubes 4 and 5 forming part of the capillary tube 1. The length of the capillary tube is greater than the distance between the two branch tubes. The branch tubes are fused to an external tube 6 more or less coaxially arranged with the capillary tube 1. Windows 7 and 8 through which light passes are provided at each end of the external tube, thereby tightly sealing the interior of the tube. The capillary tube 1 and the external tube 6 are charged with $CO_2$ or some other gaseous lasing medium. The cathode and anode are connected to a power supply source 12 comprising a D.C. source 9, a resistor 10 for stabilizing the discharge between the cathode and anode and a trigger voltage source 11.

In the above arrangement, a D.C. voltage and a trigger voltage are applied between the cathode and anode by the D.C. source 9 and the trigger voltage source 11. As a result, a constant D.C. discharge is generated in the capillary tube 1, the discharge current being maintained at a value best suited for laser action. Further, since the impedance of the path from the anode 3 to the cathode 2 via the space between the external tube 6 and the capillary tube 1 is higher than that of the path from the anode 3 to the cathode 2 via the interior of the capillary tube 1, there is no discharge in the space between the external tube and the capillary tube 1.

Plasma is produced in the capillary tube 1 by the discharge and the gaseous medium is ionized. The plasma area P within the capillary tubes is indicated by cross-hatching on the drawings. Laser action is carried out by two reflectors 13 and 14 constituting a laser resonator.

In the case of the $CO_2$ laser, the $CO_2$ molecules are positively ionized and in the case of the He-Ne laser, for example, the Ne gas is positively ionized. Hence, the ionized gases are attracted towards the cathode by electro-phoresis. The ionized gas, upon reaching the cathode, is neutralized and then rapidly returned to the anode 3 via the path between the tubes.

As a result, the gas pressure in the capillary tube remains constant at all times thereby, ensuring a stabilized laser output. Further, since the gas does not collect on the cathode, the amount of gas absorbed is minimal. Again, in spite of gas leakage through the capillary tube as a result of the capillary tube being heated by gas discharge, the gas pressure in said tube remains perfectly constant, since the escaping gas is returned to the tube via the space between said tube and the external tube. Consequently, the life of the gas laser according to this invention is not curtailed.

In the embodiment shown in FIG. 1, the trigger voltage for triggering the discharge in the capillary tube is applied between the cathode and anode. As an alternative, however, it is possible to provide a trigger electrode in the vicinity of the cathode or anode.

Figure 2:
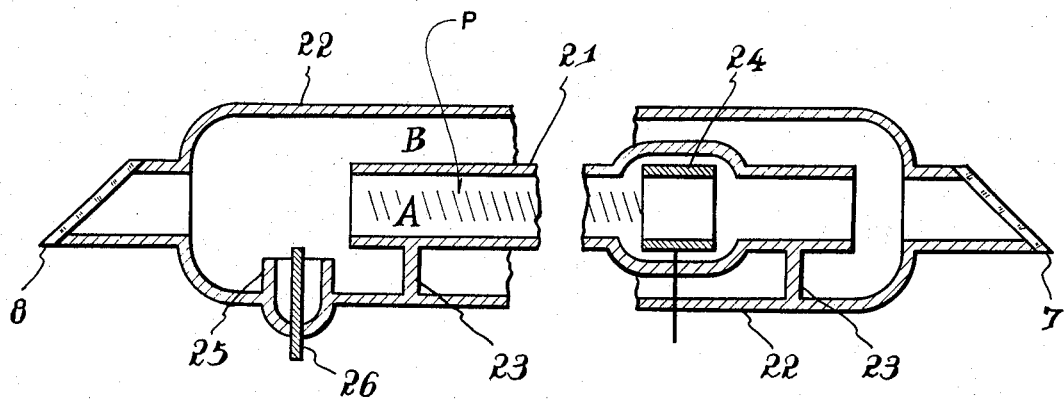
FIG. 2 shows a modified embodiment of the gas laser shown in FIG. 1.

In the embodiment shown in FIG. 2, a capillary tube 21 is fixed to the external tube 22 by two members 23 fused to the external tube. A cylindrical cathode 24 is coaxially arranged in the capillary tube 21. An anode 26 is provided in a branch tube 25, forming part of the external tube 22, said branch tube being in the near vicinity of one end of the capillary tube 21. Since the impedance of the path from the anode 26 to the cathode 24 via the area A in the capillary tube 21 is lower than that of the path from the anode via the area B between the capillary tube 21 and the external tube 22, the discharge is generated via the area A by applying the D.C. and trigger voltages between the anode and cathode.

In the above embodiment, the gas ionized by the discharge is attracted towards the cathode 24, where it is neutralized and then returned to the anode side of the external tube 22 via the area B. Further, since the gas escaping through the capillary tube wall permeates the area B and returns to the capillary tube, the life of the gas laser as shown in FIG. 2 is not curtailed and the output of the laser is stable.

Figure 3:
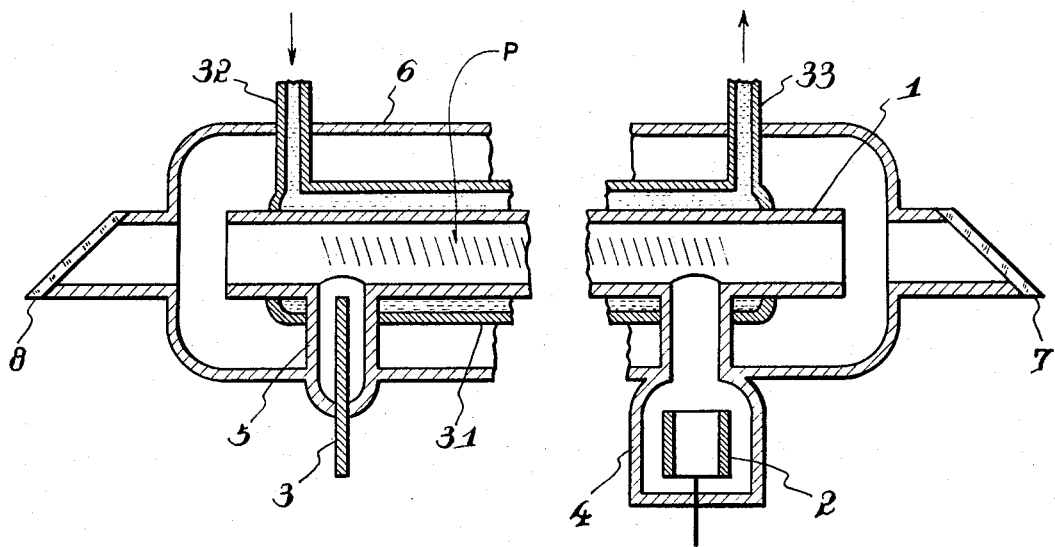
FIG. 3 shows yet another modified embodiment according to this invention.

In the embodiment shown in FIG. 3, the capillary tube as shown in FIG. 1 is cooled in order to increase the laser output. Common parts in both figures are numbered identically. A cooling tube 31 is coaxially arranged around the capillary tube 1. Cooling water applied via an inlet pipe 32 circulates through the cooling tube 31, the heated cooling water due to heat exchange being forced out through outlet pipe 33. In this way, the temperature of the plasma generating area in the capillary tube 1 is lowered and the laser output is increased.

Having thus described the invention with the detail and particularity as required by the Patent Laws, what is desired protected by Letters Patent is set forth in the following claims.

We claim:

1. A gas laser having an active medium of ionized gas comprising:
   A. an external tube for enclosing the gaseous medium;
   B. a capillary tube opened at both ends arranged about the lasing axis and within the enclosure of the external tube, there being an annular space formed between said external and capillary tubes, said space being in direct communication with both open ends of the capillary tube;
   C. a cathode and an anode arranged for generating a ionized gas producing D. C. discharge, said cathode and anode arranged with the lowest impedance path therebetween passing through a portion of said capillary tube less than the entire length thereof, such that an ionized gas area shorter than said tube is produced within said tube, said capillary tube defining spaced openings such that the ionized gas upon reaching said cathode is neutralized and returned to said anode via the path between said capillary and external tubes; and,
   D. a laser resonator for carrying out laser action.

2. A gas laser having an active medium of ionizeed gas comprising:
   A. an external tube for enclosing the gaseous medium;
   B. a capillary tube opened at both ends arranged about the lasing axis and within the enclosure of the external tube, there being an annular space formed between said external and capillary tubes, said space being in direct communication with both open ends of the capillary tube;
   C. two branch tubes connected with said capillary tube between the open ends thereof;
   D. a cathode and an anode for generating a ionized gas producing D. C. discharge, said cathode and anode respectively arranged in said branch tubes, the length of said capillary tube being longer than the ionized gas produced in said capillary tube and such that the ionized gas upon reaching said cathode is neutralized and returned to said anode via the path between said external and capillary tubes; and,
   E. a laser resonator for carrying out laser action.

3. A gas laser having an active medium of ionized gas comprising:
   A. an external tube for enclosing the gaseous medium;
   B. a capillary tube opened at both ends arranged about the lasing axis and within the enclosure of the external tube, there being an annular space formed between said external and capillary tubes, said space being in direct communication with both open ends of the capillary tube;
   C. a cooling tube arranged around said capillary tube for containing cooling water applied into said cooling tube;
   D. a cathode and an anode for generating a ionized gas producing D. C. discharge, said cathode and anode arranged with the lowest impedance path therebetween passing through a portion of said capillary tube less than the entire length thereof, such that an ionized gas area shorter than said tube is produced within said tube, and such that the ionized gas upon reaching said cathode is neutralized and returned to said anode via the path between said cooling and external tubes; and,
   E. a laser resonator for carrying out laser action.

4. A gas laser according to claim 3 wherein the gaseous medium includes carbon dioxide gas.

* * * * *

UNITED STATES PATENT OFFICE
CERTIFICATE OF CORRECTION

Patent No. 3,781,708                    Dated December 25, 1973

Inventor(s) Noboru Henmi et al.

It is certified that error appears in the above-identified patent and that said Letters Patent are hereby corrected as shown below:

Claim 2, column 3, line 28, "ionizeed" should read -- ionized --.

Signed and sealed this 25th day of June 1974.

(SEAL)
Attest:

EDWARD M. FLETCHER, JR.
Attesting Officer

C. MARSHALL DANN
Commissioner of Patents

UNITED STATES PATENT OFFICE
CERTIFICATE OF CORRECTION

Patent No. 3,781,708　　　　　Dated December 25, 1973

Inventor(s) Noboru Henmi and Hiromi Kumagai

It is certified that error appears in the above-identified patent and that said Letters Patent are hereby corrected as shown below:

On the first page of the patent after the line listing the inventors insert the following:

--Assignee: Nihon Denshi Kabushiki Kaisha--.

Claim 2 Column 3 Line 28

--ionizeed-- should read --ionized--.

Signed and Sealed this eleventh Day of November 1975

[SEAL]

Attest:

RUTH C. MASON
Attesting Officer

C. MARSHALL DANN
Commissioner of Patents and Trademarks